April 26, 1938.    R. L. NASH    2,115,534
BRAKE CONTROL DEVICE
Filed Oct. 14, 1936
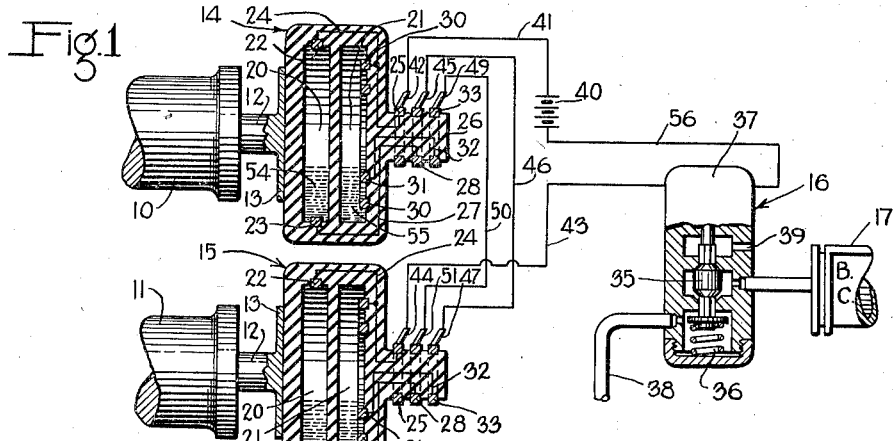
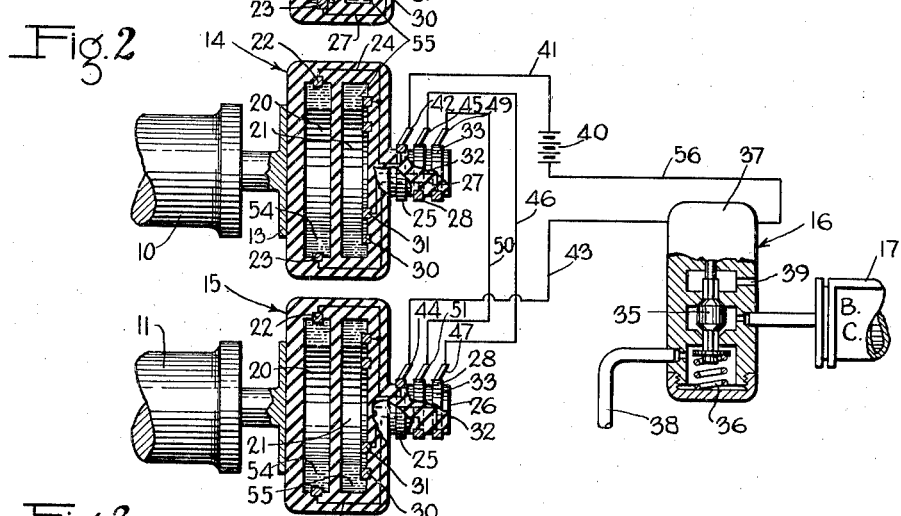
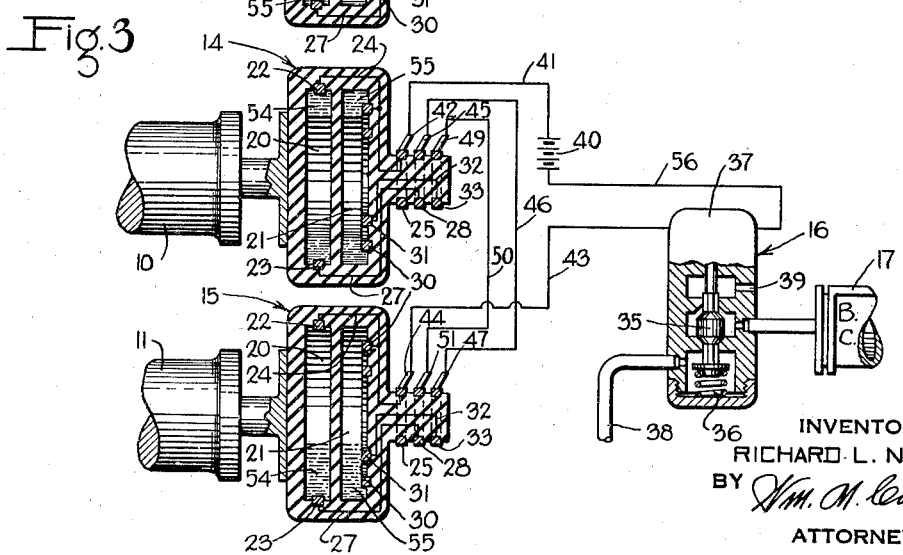
INVENTOR
RICHARD L. NASH
BY Wm. M. Cady
ATTORNEY Patented Apr. 26, 1938

2,115,534

UNITED STATES PATENT OFFICE 2,115,534

BRAKE CONTROL DEVICE

Richard L. Nash, Wilkinsburg, Pa., assignor to The Westinghouse Air Brake Company, Wilmerding, Pa., a corporation of Pennsylvania Application October 14, 1936, Serial No. 105,450

10 Claims. (Cl. 188—181)

This invention relates to brake control devices, and more particularly to brake control devices for controlling the brakes in response to slipping or sliding of the vehicle wheels due to application of the brakes.

In bringing a railway vehicle to a stop it is usually desirable that the stop be made in the shortest possible time and distance commensurate with comfort to the passengers and freedom from undue shock. To meet this requirement it is necessary that high braking forces be employed. The employment of high braking forces introduces the hazard of wheel slipping or sliding, either of which is undesirable because slipping or sliding wheels are not capable of producing the maximum possible retarding effort, and in the case of sliding wheels flat spots may be worn on the wheels, rendering them unfit for regular service.

When wheels slip or slide the brakes on such wheels should be released as soon as possible to remedy this condition. It is, of course, preferable that the brakes be released only on the sliding wheels, and that the brakes on wheels which are not sliding remain applied. A principal object of the present invention is to provide means for automatically releasing, or diminishing the braking force on, those wheels which slip or slide.

A further and more specific object of the present invention is to provide an electropneumatic means which operates in response to relative rotation between two vehicle axles, one of which is rotating at a speed lower than the other due to slipping or sliding of the associated wheels, to release the brakes on the wheels associated with both axles.

Other and more specific objects of the invention, dealing with novel constructions and arrangements of parts, will be more fully understood from the following description, which is taken in connection with the attached drawing, wherein, Fig. 1 shows an embodiment of the invention adapted to two vehicle axles, the parts being shown for the condition when the two axles are at rest, or are rotating together at substantially the same speed but below a predetermined speed.

Fig. 2 shows the same embodiment with the position of the parts shown for the condition when the two axles are rotating at substantially the same speed and above the said predetermined speed.

Fig. 3 shows the same embodiment with the parts in the position assumed when one axle is rotating at a speed lower than the other, as when the wheels associated with that axle slip or slide.

Referring now to the drawing, two vehicle axles are indicated at 10 and 11, each of which is provided with a reduced extension 12 having a flanged end 13. Secured to the flanged end 13 of the axle 10 is a centrifugal switch mechanism 14, and similarly secured to the axle 11 is a like switch mechanism 15. The two switch mechanisms 14 and 15 control the operation of a magnet valve device 16, which controls the pressure in a brake cylinder 17. The brake cylinder 17 is to be understood to be the brake operating device for the brakes on the four wheels associated with the two axles 10 and 11. The brake rigging is not shown and is to be assumed to be of conventional design.

The two switch mechanisms 14 and 15 are preferably of duplicate design, each comprising a casing of insulating material so constructed as to form two liquid tight chambers 20 and 21. These chambers are cylindrical in shape and concentric to the axis of rotation of each of the axles 10 and 11. Disposed within the chamber 20 on the inside periphery thereof, are two contacts 22 and 23. These contacts are shown as being diametrically opposed, for the sake of convenience in illustration, but, as the description and operation of the invention proceeds, it will be understood that this precise arrangement is not wholly essential to the success of the invention. The contact 22 is connected by conductor 24 to a slip ring 25 suitably disposed on an extension 26 of the switch casing. The contact 23 is connected by a conductor 27 to a similar but separate slip ring 28.

Disposed within the chamber 21 are two contact rings 30 and 31. These rings are preferably arranged concentric to one another, and concentric to the axis of rotation of the associated axle. The contact ring 30 is, as illustrated, connected to the conductor 24 leading to the slip ring 25, while the contact ring 31 is connected by conductor 32 to another slip ring 33.

Considering now the magnet valve device 16, this device is embodied in a casing having disposed therein a double beat valve 35 urged toward an upper seated position by a spring 36, and to a lower seated position by an electromagnet 37 when energized. When the double beat valve 35 is in upper seated position, a communication is established between a supply pipe 38 and the brake cylinder 17. When the double beat valve 35 is in lower seated position this communication is cut off, and the brake cylinder 17 is connected to the atmosphere past the open upper seat of the double beat valve 35 and through an exhaust port 39.

Considering now the connections between the slip rings of the two switch devices 14 and 15, and between these slip rings and the magnet valve device 16, it will be noted that one terminal of a battery 40, which constitutes a convenient source of current supply, is connected to the slip ring 25 of the switch device 14 by conductor 41 and brush 42. The other terminal of the battery 40 is connected to one side of the electromagnet 37. The other terminal of the electromagnet 37 is connected by conductor 43 and brush 44 to the slip ring 25 of the switch device 15.

The slip ring 28 of the switch device 14 is connected to the slip ring 33 of the switch device 15 by means of brush 45, conductor 46, and brush 47. The slip ring 33 of the switch device 14 is connected to the slip ring 28 of the switch device 15, by way of brush 49, conductor 50, and brush 51.

Considering now the operation of this embodiment of my invention, while the following description deals only with the adaptation of the invention to two vehicles axles, preferably comprising the two axles of a single truck, it is to be understood that each pair of axles on a vehicle will be provided with the two switch mechanisms and magnet valve device, as illustrated in each of the figures of the drawing.

When each of the switch devices is installed on a vehicle axle, each of its chambers 20 and 21 is filled with a current conducting fluid medium 54 and 55, respectively, such for example as mercury, to a level such that in the chamber 21 the mercury will connect together the two rings 30 and 31 when the two axles 10 and 11 are at rest, or are rotating at any speed below a predetermined or critical speed. Thus for these conditions the mercury in each chamber will assume substantially the position indicated in Fig. 1. For this position of the mercury in each of the chambers 20 and 21, the magnet valve device 16 will be deenergized. This may be made clear by attempting to trace a circuit from the battery 40 to the electromagnet 37, as follows.

Beginning at the upper terminal of battery 40, a possible circuit may include the conductor 41, brush 42, slip ring 25 of switch 14, and conductor 24, which connects to both the outer ring 30 and the contact 22 of switch 14. The contact 22 is at this time not connected to the contact 23 by the mercury 54, so that no circuit can extend in this direction. However, from the outer contact ring 30, the possible circuit may include the mercury 55 in the chamber 21, the inner ring 31, conductor 32, slip ring 33, brush 49, conductor 50, brush 51, slip ring 28 of switch device 15, conductor 27, and contact 23. Here, however, the circuit is interrupted due to the lack of connection between the contact 23 and the contact 22, which leads to the electromagnet 37 by way of conductor 24, slip ring 25, brush 44, and conductor 43. Since there is no complete circuit to the electromagnet 37, it remains deenergized, and the communication between the supply pipe 38 and brake cylinder 17 is now held open.

To apply the brakes, fluid under pressure to a suitable degree is supplied through the supply pipe 38 to the brake cylinder 17. For the sake of illustration it will be assumed that the degree of the supply is such as to produce slipping or sliding of the wheels associated with axle 11.

Before the brakes are applied, and also while they are applied and before the wheels commence to slide, if the speed at which the axles 10 and 11 is rotating is above the aforesaid predetermined or critical speed, the mercury in each of the chambers 20 and 21, of both switch devices, will assume the position as illustrated in Fig. 2. In each of the switch devices the mercury 54 in the chamber 20 will connect the two contacts 22 and 23, while in the chamber 21 the mercury disconnects the two contact rings 30 and 31. It will, of course, be appreciated that the mercury in each chamber is now in the form of an annulus, due to the action of the centrifugal force resulting from rotation of the two axles.

For this position of the mercury in each chamber, the magnet valve device 16 will remain deenergized. This may be demonstrated by an attempt to trace a completed circuit to the electromagnet 37, in Fig. 2. Beginning at the upper terminal of battery 40, a possible circuit may include conductor 41, brush 42 of switch device 14, slip ring 25, and conductor 24, which connects with both contact 22 and outer ring 30. The two rings 30 and 31 are disconnected at this time by the mercury 55, so that the circuit cannot extend in this direction.

From contact 22, however, a possible circuit includes the mercury 54, contact 23, conductor 27, a slip ring 28, brush 45, conductor 46, brush 47 of switch device 15, slip ring 33, conductor 32, and inner ring 31 of the switch device 15. Here, however, the circuit ends because of the lack of connection between the two rings 30 and 31, it being noted that the outer ring 30 connects to the electromagnet 37, as previously described.

It should, therefore, be clear that so long as the two axles 10 and 11 rotate at substantially the same speed, regardless of the position of the mercury in each of the chambers 20 and 21, the electromagnet 37 will remain deenergized.

Assuming now that the wheels associated with the vehicle axle 11 commence to slip, or actually slide, the mercury in the two switch devices 14 and 15 will assume the positions as shown in Fig. 3. In the switch device 14 the mercury will remain in the same position as was shown in Fig. 2, that is, assuming that the vehicle is still traveling at a speed above the aforesaid predetermined or critical speed. In the switch device 15, however, assuming that due to slipping or sliding of the wheels associated with the axle 11 that the speed has decreased below the aforesaid predetermined or critical speed, the mercury in this switch device will assume the position as illustrated, corresponding to that shown in Fig. 1. The electromagnet 37 in the magnet valve device 16 will be now energized by way of the following circuit.

Beginning at the upper terminal of battery 40, this circuit includes conductor 41, brush 42, slip ring 25 of switch 14, conductor 24, contact 22, mercury 54, contact 23, conductor 27, slip ring 28, brush 45, conductor 46, brush 47 of switch device 15, slip ring 33, conductor 32, inner contact ring 31, mercury 55, outer contact ring 30, conductor 24, slip ring 25, brush 44, conductor 43, and the electromagnet 37, the return circuit to the battery being by way of conductor 56.

Upon energization of the electromagnet 37, the double beat valve 35 is shifted to its lower seated position, closing communication between the supply pipe 38 and the brake cylinder 17, and opening communication between the brake cylinder and the atmosphere by way of exhaust port 39. Fluid under pressure will as a consequence be released from the brake cylinder 17, causing the brakes on the wheels associated with both axles 10 and 11 to be released.

As soon as the brakes are sufficiently released, the wheels associated with the axle 11 will commence to rotate again, and when the two axles 10 and 11 are rotating at substantially the same speed, the mercury in the two switch devices will assume the position shown in either Fig. 1 or Fig. 2, depending upon whether the speed is above or below the predetermined or critical speed. When this takes place, the electromagnet 37 will be deenergized and the release of fluid under pressure from the brake cylinder 17 will be terminated.

Of course, if the wheels should again slip or slide, as may take place due to the increasing coefficient of friction between the brake shoes and wheels upon a further decrease in vehicle speed, the cycle just described will repeat itself.

It is, of course, possible that the wheels on both axles 10 and 11 may slip or slide simultaneously. This is, however, a rare incident. Even should the wheels on both axles slide concurrently, the rate at which one axle speed diminishes, due to slipping or sliding of the wheels, is generally always quite different from the rate at which the other axle diminishes in speed. The apparatus will, therefore, function as described due to this difference in rate of speed change, to reduce brake cylinder pressure during the interval in which the wheel speed changes from that corresponding to the speed of the vehicle to zero speed, corresponding to a locked wheel state. The exhaust port 39 of the magnet valve device 16 may be made sufficiently large to release brake cylinder pressure fast enough so that the wheel slipping condition may be substantially corrected before the wheel reaches a locked wheel stage.

It will be seen therefore that the apparatus shown will operate successfully to inhibit wheel sliding for the usual conditions encountered in practice.

While I have shown and described an embodiment of my invention it is not my intention to be limited to the specific details of this embodiment, nor otherwise than by the spirit and scope of the appended claims.

Having now described my invention, what I claim as new and desire to secure by Letters Patent, is:

1. In a vehicle brake system, in combination, two vehicle axles, brake operating means for operating the brakes on wheels associated with said axles, two fluid type switch devices each of which is associated with one of said axles, means for forming an electrical circuit including said two switch devices, said circuit being maintained opened by said switch devices when said two axles are rotating at substantially the same speed and being closed by said switch devices when one of said axles is rotating at a lower speed than the other, and means responsive to closing of said circuit for controlling the operation of said brake operating means.

2. In a vehicle brake system, in combination, two vehicle axles, two fluid type switch devices each of which is associated with one of said axles, each of said switch devices having contacts some of which are maintained connected by the fluid when the associated axle is rotating above a predetermined speed, and the other of which are disconnected by the fluid when the associated axle is rotating above said predetermined speed, brake operating means for operating the brakes on wheels associated with the said two axles, and means controlled by said contacts for controlling the degree of operation of said brake operating means.

3. In a vehicle brake system, in combination, a brake cylinder, an electroresponsive device for controlling brake cylinder pressure, two centrifugally operated switch devices, each of which has a first set of contacts adapted to be closed only above a predetermined speed and a second set of contacts adapted to be closed only below said predetermined speed, and means controlled by the contacts of both of said switch devices for controlling the operation of said electroresponsive device.

4. In a vehicle brake system, in combination, two vehicle axles, a brake cylinder for operating the brakes associated with wheels of both of said axles, a centrifugal switch carried by one of said axles, a second centrifugal switch device carried by the other of said axles, each of said switch devices having a plurality of contacts, and means controlled by said contacts for controlling brake cylinder pressure and operative when one of said axles is rotating at a speed substantially below the other for diminishing brake cylinder pressure.

5. In a vehicle brake system, in combination, a brake cylinder, a magnet valve device for controlling brake cylinder pressure, two vehicle axles, a centrifugally operated switch device of the fluid type associated with one of said axles, a similar centrifugally operated switch device of the fluid type associated with the other of said axles, and circuit means interconnecting said switch devices with said magnet valve device and operative to maintain said magnet valve device deenergized so long as said two axles are rotating at substantially the same speed, and operative to energize said magnet valve device when one of said axles diminishes in speed below the speed of the other.

6. In a vehicle brake system, in combination, a brake cylinder, a magnet valve device operative when deenergized to open communication between a source of supply and said brake cylinder, and operative when energized to close said communication and to open communication between said brake cylinder and the atmosphere, two vehicle axles, a first switch device associated with one of said axles, a second switch device associated with the other of said axles, both of said switch devices having contacts and a fluid medium for connecting said contacts, a source of current supply, and circuit means for connecting said source of current supply to said magnet valve device through the contacts of said two switch devices, said switch devices being operative to maintain the circuit from said source to said magnet valve device opened so long as said two axles are rotating at substantially the same speed, and to close said circuit when one of said axles diminishes in speed substantially below the speed of the other.

7. In a vehicle brake system, in combination, a brake cylinder, an electroresponsive valve device operative only when energized to reduce brake cylinder pressure, two axles, a switch device associated with one of said axles, a second switch device associated with the other of said axles, each of said switch devices having a first set of contacts closable and a second set of contacts openable above a predetermined speed, said first set of contacts being openable and said second set of contacts closable below said predetermined speed, and circuit means interconnecting said contacts and said magnet valve device with a source of current supply, said contacts in said two switch devices being operative to maintain the circuit to said magnet valve device open at all times except when the speed of one of said axles reduces in speed below the other.

8. In a vehicle brake system, in combination, two vehicle axles, a brake cylinder for operating the brakes on wheels associated with said axles, a magnet valve device for controlling brake cylinder pressure and operable when the electrical state thereof is changed to modify brake cylinder pressure, a first mercury switch device associated with one of said axles, a second mercury switch device associated with the other of said axles, each of said switch devices having a plurality of contacts opened and closed by engagement with mercury depending upon the speed of rotation of the associated axle, and means so constructed and arranged that so long as said two axles are rotating at substantially the same speed the electrical state of said magnet valve device is unchanged, and operative when one of said axles diminishes in speed below the speed of the other, when the brakes are applied, to change the electrical state of said magnet valve device to modify brake cylinder pressure.

9. In a vehicle brake system, in combination, two vehicle axles, a brake cylinder for operating the brakes on wheels associated with said two axles, a centrifugal fluid type switch device associated with one of said axles, a second centrifugal fluid type switch device associated with the other of said axles, a magnet valve device for controlling brake cylinder pressure, and means including electrical circuits interconnecting said two switch devices and said magnet valve device, and being so constructed and arranged that so long as said two axles are rotating at substantially the same speed one of said switch devices maintains the circuit to said magnet valve device opened, but upon a decrease of speed of one of said axles below the other, when the brakes are applied, the circuit to said magnet valve device is completed by both of said switch devices.

10. In a vehicle brake system, in combination, two vehicle axles, a brake cylinder for operating the brakes on wheels associated with said two axles, a switch device carried by and rotatable with one of said axles, a second switch device carried by and rotatable with the other of said axles, each of said switch devices being provided with two chambers, each of said chambers having contacts disposed therein and containing a current conducting fluid medium, the fluid medium in one of said chambers being adapted to connect together the contacts in that chamber when the switch device is rotating below a predetermined speed, while the fluid medium in the other chamber at the same time maintains the contacts in that chamber opened, the fluid medium in the first mentioned chamber being adapted to disconnect the contacts in that chamber when the switch device is rotating above said predetermined speed, while at the same time the fluid medium in the second mentioned chamber connects together the contacts in that chamber, a magnet valve device operative when energized to reduce brake cylinder pressure, a source of current supply, and means including electrical circuits interconnecting the contacts in each of said switch devices with said source of current and said magnet valve device, and being so constructed and arranged that said magnet valve device is not energized except when one of said axles is rotating at a speed substantially different from the speed of rotation of the other axle.

RICHARD L. NASH.